United States Patent [19]
Wiesler et al.

[11] 3,810,017
[45] May 7, 1974

[54] PRECISION PROBE FOR TESTING MICRO-ELECTRONIC UNITS

[75] Inventors: Mordechai Wiesler, Lexington; John S. MacIntyre, Lynnfield, both of Mass.

[73] Assignee: Teledyne, Inc., Hawthorne, Calif.

[22] Filed: May 15, 1972

[21] Appl. No.: 253,327

[52] U.S. Cl. .................... 324/158 P, 324/158 F
[51] Int. Cl. ............................................. G01r 31/02
[58] Field of Search............ 324/158 P, 158 F, 72.5, 324/149

[56] References Cited
UNITED STATES PATENTS
3,551,807  12/1970  Kulischenko et al............ 324/158 P OTHER PUBLICATIONS
Wiesler, M.; "Probers in . . . ;" Solid State Technology; March 1969; pg. 41-44.

*Primary Examiner*—Alfred E. Smith
*Assistant Examiner*—Ernest F. Karlsen
*Attorney, Agent, or Firm*—Morse, Altman, Oates & Bello

[57] ABSTRACT

A test probe, for electronically contacting microelectronic units, comprises a rigid rearwardly projecting portion and a flexible forwardly projecting portion, fixedly connected together, and an adjusting screw turned into a threaded bore in the rearwardly projecting portion and bearing against the forwardly projecting portion, whereby extremely fine adjustment of the probe tip is possible.

12 Claims, 6 Drawing Figures

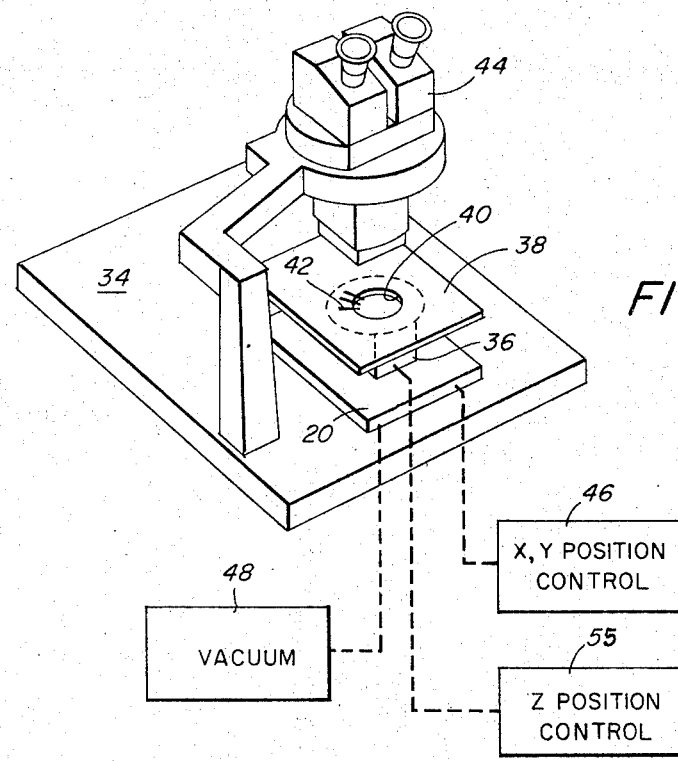
FIG. 1
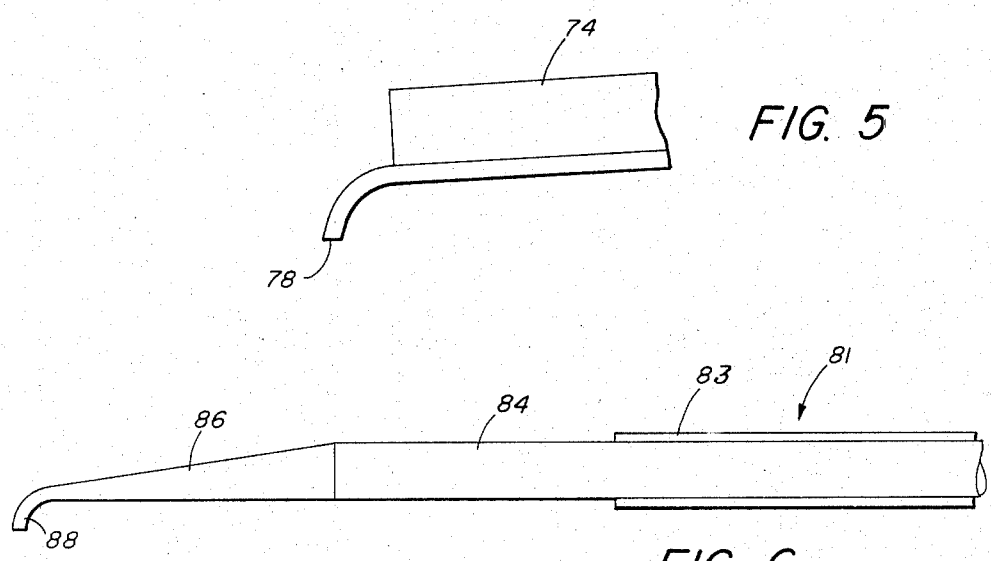
FIG. 5
FIG. 6

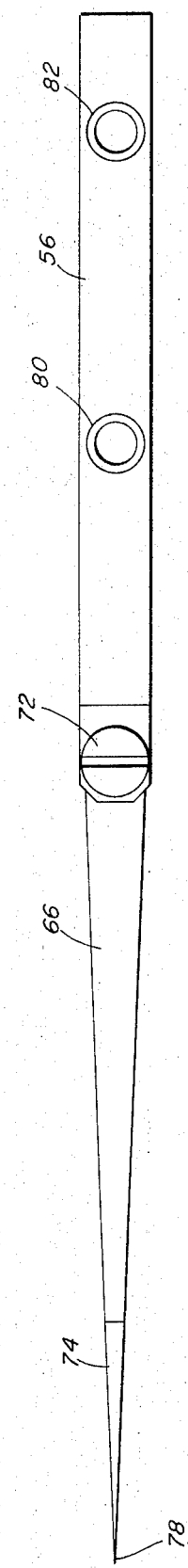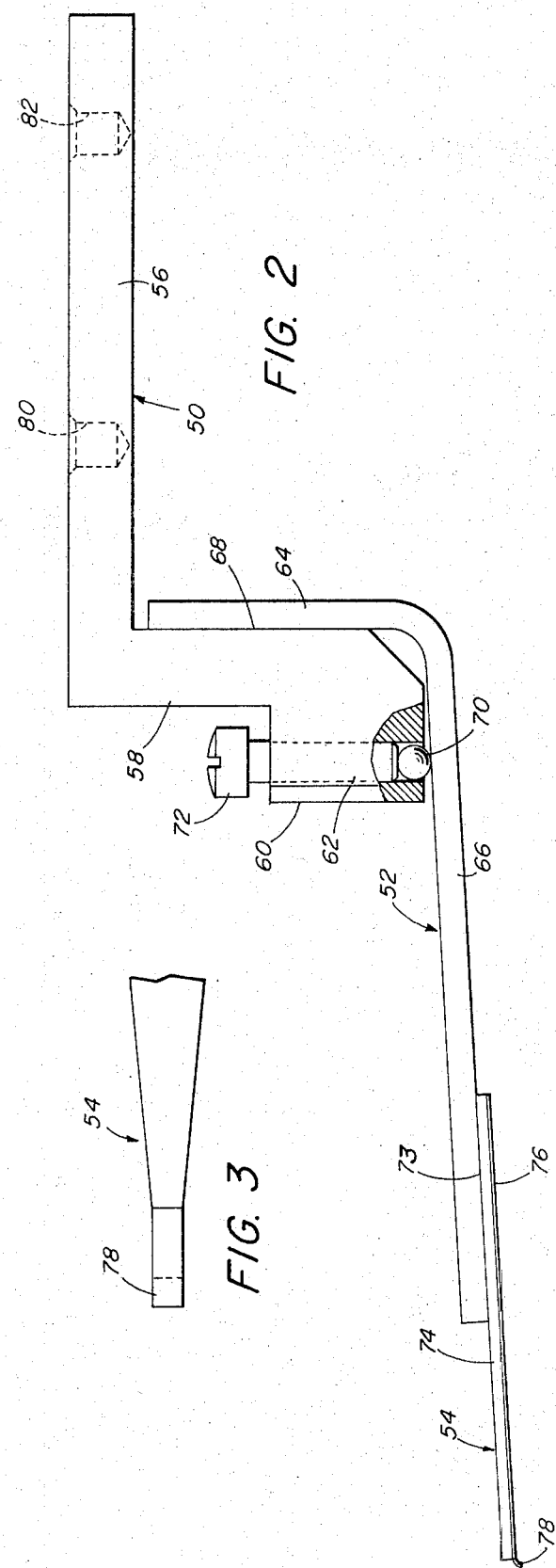

3,810,017

PRECISION PROBE FOR TESTING MICRO-ELECTRONIC UNITS

BACKGROUND AND SUMMARY

The present invention relates to the testing of micro-electronic units and, more particularly, to the testing of micro-electronic units typified by an array of solid state transistors, diodes or integrated circuits, which have been fabricated on a support wafer and which are to be tested and classified prior to their being isolated and sorted. In such a test device, the wafer typically is positioned on a support that is movable with respect to one or more stationary electrical probes, markers and/or other sensors. The operational sequence involves first moving the support along the X and Y axes in order to register a selected micro-electronic unit with respect to the sensors and then moving the support along the Z axis in order to cause a selected micro-electronic unit to be contacted by the sensors. Successive selection of the micro-electronic units of the array is continued until each of the micro-electronic units on the wafer has been tested and classified. It is desired that one of the sensors, in the form of an electrical contact probe, be unprecedently compact and yet precisely adjustable.

The primary object of the present invention is to provide a test probe, for electronically contacting micro-electronic units, comprising a rigid rearwardly projecting portion and a flexible forwardly projecting portion, fixedly connected together, and an adjusting screw turned into a threaded bore in the rearwardly projecting portion and bearing against the forwardly projecting portion, whereby extremely fine adjustment of the probe tip is possible. Another object of the present invention is to provide a test probe comprising a relatively rigid L-shaped bracket and a relatively flexible L-shaped bracket, respectively having depending and upstanding portions, which are soldered together at their inner edges, free rearwardly and forwardly extending portions, of which the former is affixed within a test apparatus and the latter is soldered to a probe tip, and an adjusting screw turned into a bore in the depending portion of the rigid L-shaped bracket and bearing against the forwardly extending portion of the flexible L-shaped bracket, whereby extremely fine adjustment of the probe tip is possible. A further object of the present invention is to provide a test apparatus for an array of micro-electronic units, which apparatus incorporates a test probe of the foregoing type.

Other objects of the present invention will in part be obvious and will in part appear hereinafter.

The invention accordingly comprises the illustrated apparatus and element, together with their components and interrelationships, which are exemplified in the accompanying disclosure, the scope of which will be indicated in the appended claims.

BRIEF DESCRIPTION OF THE DRAWINGS

For a fuller understanding of the nature and objects of the present invention, reference is to be had to the following detailed description, taken in connection with the accompanying drawings, wherein:

FIG. 1 is a schematic view, partly in mechanical perspective and partly in block diagram, of an apparatus of a type in which a probe of the present invention is incorporated;

FIG. 2 is a side elevation of a preferred test probe embodying the present invention;

FIG. 3 is a top plan view, greatly enlarged, of the tip of the test probe of FIG. 2;

FIG. 4 is a top plan view of the probe of FIG. 2;

FIG. 5 is a side view, greatly enlarged, of the tip of the test probe of FIG. 2; and FIG. 6 is a side view of a portion of an alternative embodiment of a test probe embodying the present invention.

DETAILED DESCRIPTION

As shown in FIG. 1, a support 20 for an array of micro-electronic units is positioned under the constraint of an X,Y movement. Supported on plate 20 is a Z axis movement 36, Z axis movement carrying a vacuum chuck capable of supporting a wafer on which the array of micro-electronic units have been fabricated. Fixedly mounted above Z axis movement 36 is a centrally opened probe support plate 38 having a central opening 40 which generally is positioned above movement 36 and which, in accordance with the present invention, carries a plurality of test probes 42 that project from the portion of plate 38 surrounding the opening to positions overlying the opening. It will be apparent that when plate 20 is positioned as desired along X and Y axes and the vacuum chuck is moved along the Z axis upwaredly, then probes 42 are capable of contacting the micro-electronic units on the wafer retained by the chuck. Mounted above opening 40 is a stereo microscope 44 by which the wafer may be observed during any testing process. As shown, the position of the plate 20 along X and Y axes is adjusted by an electromechanical control 46, the position of vacuum chuck 36 along the Z axis is adjusted by an electromechanical control 55, and the vacuum chuck on movement 36 is provided with a vacuum by a suitable pump 48.

The probe of the present invention, as illustrated in FIGS. 2, 3, 4, and 5, comprises and L-shaped bracket 50 by which the probe is positioned and an L-shaped bracket 52, by which a probe tip 54 is carried. Probe tip 54 is intended to contact micro-electronic units in the manner described above. Each of L-shaped bracket 50 and L-shaped bracket 52 is composed of a high conductivity conducting metal such as beryllium copper alloy. Probe tip 54 is composed of high conductivity copper.

As shown, L-shaped bracket 50 is a casting or stamping having a rearwardly directed bar portion 56 that is rectangular in vertical cross section and a downwardly directed bar portion 58 that is rectangular in horizontal cross section. Bar portion 58 has a forwardly directed shoulder portion 60 that has a vertically directed threaded bore 62 therethrough. L-shaped bracket 52 comprises an upwardly directed portion 64 and a forwardly directed portion 66. Consideraing a vertical plane as shown in FIG. 2, the stiffness of bracket 50 is at least twice as great as the stiffness of bracket 52 so that bracket 50 is relatively rigid and bracket 52 is relatively flexible. The forward edge of portion 64 is soldered with a lead-tin alloy as at 68, to the rearward edge of portion 58. It will be observed that generally forwardly extending portion 66 of bracket 52 is entirely free of downwardly extending portion 60 of bracket 50, thereby being in condition for flexing to a precisely desired orientation under the control of a bearing ball 70 at the unthreaded lower end of bore 62 and a screw 72 which is turned into the internally threaded portion of bore 62.

Probe tip 54 includes a generally forwardly extending support bar, the rearward upper face of which is soldered, with a lead-tin alloy as at 73 to the lower face of forwardly extending portion 66. Soldered, with a lead-tin alloy, to the lower face of support bar 74 is a wire 76, which is bent downwardly at its free forward extremity 78.

Projecting into rearwardly extending portion 56 of bracket 50 are a pair of bores 80, 82 which are capable of receiving probes, which hold the probe for positioning in the X,Y plane and supply the rearwardly extending portion with electrical power that generates heat in order to enable ready soldering to a support. In operation, the arrangement is such that when the lower face of portion 56 rests upon a desired position of a printed circuit board, and a supply of solder has been interposed, an electrical current passed between bores 80 and 82 causes resistance heating of the region, melting of the solder and, following cooling, bonding of the bracket to the printed circuit board, with bracket 52 disposed within a center opening in the printed circuit board. Thereafter, rotational adjustment of screw 72, by means of a slot in the end of screw 72, causes flexing of forwardly extending portion 66 of holder 52 and precision adjustment of the height of probe tip 76 with respect to the printed circuit board.

An alternative embodiment of the present invention replaces probe tip 54 by an alternative probe tip 81 which, as shown in FIG. 6, includes a circular cross-section tube 83 which is soldered to an L-shaped bracket 52, like probe tip 54. A wire extension 84 is held frictionally within tube 82, which is crimped about the portion of the wire extension therewithin. The wire extension has a forwardly tapered, ground tip 86, the forward extremity of which is downwardly bent as at 88.

OPERATION

In operation, a wafer, upon which an array of micro-electronic units has been fabricated, is positioned on vacuum chuck 36. While under observation through microscope 44, plate 20 is positioned along X and Y axes until the test probes are in registration with appropriate portions of a selected one of the micro-electronic units. Next vacuum chuck 36 is actuated in order to cause movement of the wafer and the selected micro-electronic unit along the Z axis into contact with probes 42. This process is continued sequentially until all of the micro-electronic units on the wafer have been so tested.

What is claimed is:

1. A test probe comprising a first generally L-shaped bracket having a rearwardly extending portion and a downwardly extending portion, a second generally L-shaped bracket having an upwardly extending portion and a forwardly extending portion, the rearward edge of said downwardly extending portion and the forward edge of said upwardly extending portion being soldered, a probe tip carried by said forwardly extending portion, said first generally L-shaped bracket being relatively rigid, said second generally L-shaped bracket being relatively flexible, said downwardly extending portion having a downwardly extending threaded bore therein, and screw means turned into said threaded bore and bearing against said forwardly extending portion, said screw means including a screw extending into said bore and a bearing ball retained in said bore and contacting said screw and said forwardly extending portion, the cross-sectional stiffness of the rearwardly projecting portion in the vertical plane being at least twice as great as the cross-sectional stiffness of the forwardly projecting portion in the vertical plane.

2. The test probe of claim 1 wherein said first L-shaped bracket and said second L-shaped bracket are composed of a copper alloy.

3. The test probe of claim 1 wherein said rearwardly extending portion has a pair of separated bores therein for the reception of electrical supply probes for resistance welding.

4. A test probe comprising a first generally L-shaped bracket having a rearwardly extending portion and a downwardly extending portion, a second generally L-shaped bracket having an upwardly extending portion and a forwardly extending portion, the rearward edge of said downwardly extending portion and the forward edge of said upwardly extending portion being soldered together, a probe tip soldered to said forwardly extending portion, said forwardly extending portion having a downwardly extending threaded bore therein, screw means turned into said threaded bore and bearing against said forwardly extending portion, and a probe contactor in the form of an elongated element having a rearward portion soldered to said probe tip and a forward extremity that is free and is downwardly bent, said first L-shaped bracket being relatively rigid and said second L-shaped bracket being relatively flexible.

5. The test probe of claim 4 wherein said screw means includes, a screw extending into said bore and a bearing ball retained in said bore and contacting said screw and said forwardly extending portion.

6. The test probe of claim 4 wherein said elongated element includes an elongated wire.

7. The test probe of claim 4 wherein said elongated element includes an elongated tube soldered to said forwardly projecting portion and an elongated wire held in said elongated tube, a free extremity of said wire constituting said forward extremity.

8. The test probe of claim 4 wherein the cross sectional stiffness of the rearwardly projecting portion in a vertical plane is at least twice as great as the cross sectional stiffness of the forwardly projecting portion in a vertical plane.

9. A test apparatus for solid state micro-electronic units in an array, said apparatus comprising a base, a vacuum chuck for retaining said array, an X,Y movement on said base, a Z movement on said X,Y movement, said vacuum chuck being carried by said Z movement, said Z movement being carried by said X,Y movement, a probe holder mounted on said base, a plurality of stationary probes mounted on said base, said X,Y movement carrying said chuck for movement along X and Y axes with respect to said probes, said Z movement carrying said chuck along a Z axis with respect to said probes each of said probes comprising a first generally L-shaped bracket having a rearwardly extending portion and a downwardly extending portion, a second generally L-shaped bracket having a downwardly extending portion and a forwardly extending portion, the rearward edge of said downwardly extending portion and the forward edge of said upwardly extending portion being soldered, a probe tip carried by said forwardly extending portion, said first generally L-shaped bracket being relatively rigid, said second generally L-shaped bracket being relatively flexible, said downwardly extending portion having a downwardly extending threaded bore therein, and screw means turned into said threaded bore and bearing against said forwardly extending portion, said screw means including a bearing ball retained in said bore and contacting said screw and said forwardly extending portion, the cross-sectional stiffness of the rearwardly projecting portion in the vertical plane being at least twice as great as the cross-sectional stiffness of the forwardly projecting portion in the vertical plane.

10. The test apparatus of claim 9 wherein each of said L-shaped brackets is composed of a copper alloy.

11. A test probe comprising a rearwardly extending upper portion, a forwardly extending lower portion and an intermediate portion extending between the forward extremity of said upper portion and the rearward extremity of said lower portion, said intermediate portion having a shoulder that is spaced from said rearward extremity of said lower portion by a gap, a probe tip carried by said forwardly extending portion, said shoulder portion having a downwardly extending threaded bore therein, and screw means turned into said threaded bore and bearing against said forwardly extending portion.

12. The test probe of claim 11 wherein said screw means includes a screw extending into said bore and a bearing ball retained in said bore and contacting said screw and said forwardly extending portion in said gap.

* * * * *